United States Patent Office 3,445,967
Patented May 27, 1969

3,445,967
CONTROL FOR GRINDING MACHINE
Arthur C. Reppenhagen, Owosso, Mich., assignor to MWA Company, Owosso, Mich., a corporation of Delaware
Filed Dec. 12, 1966, Ser. No. 600,885
Int. Cl. B24b 7/02
U.S. Cl. 51—34            7 Claims

ABSTRACT OF THE DISCLOSURE

Briefly described, the machine comprises a grinding wheel movable at opposite directions across the surface of a metal billet or slab. Relays are provided to effect reversal of the grinding wheel. Operating current to these relays is controlled by Zener diodes. One of the diodes is responsive to voltage of one polarity and given magnitude to deliver operating current to its relay, and the other diode is responsive to a voltage of the opposite polarity and given magnitude to deliver operating current to its relay. Two sources of voltage, one positive and the other negative, are applied to the Zener diodes. One voltage source passes through a resistance which varies as the grinding wheel moves. Thus, for example, the voltage applied to the diodes from this source may vary from say +18 volts to zero volts. The second voltage source is applied to one diode through one selectively variable resistance and is applied to the other diode through another selectively variable resistance.

This invention relates generally to controls for metal removing machines, and refers more particularly to adjustable mechanism for controlling the reversal of a metal removing tool such as a grinding wheel during its movement relative to a workpiece.

These selectively variable resistances are set where desired by the operator. He may, for example, set one so that the voltage applied to one diode from the second voltage source is −2 volts, and he may set the other so that the voltage applied to the other diode from the second voltage source is −17 volts. Since the positive voltage applied to the diodes from the first voltage source increases as the grinding wheel moves in one direction and decreases as it moves in the opposite direction, the diodes will deliver operating current to their respective operating relays at predetermined points in the travel of the grinding wheel depending upon the setting of the selectively variable resistances. Hence, the reversal points may be readily adjusted and determined by merely adjusting the selectively variable resistances.

BACKGROUND OF THE INVENTION

The invention pertains to the art of controlling the movement of a tool, specifically a grinding wheel, in its travel across the surface of a workpiece.

Heretofore, the reversal of grinding machines has been manually controlled by the operator, or limit switches physically located in the path of the machine have been employed. It was a time-consuming and laborious job to change positions of these limit switches when it was desired to change the points of reversal. According to the present invention, the points of reversal can be readily changed by merely adjusting the selectively variable resistances which may be located in the operator's cab and easily accessible to him.

SUMMARY

It is an essential object of the invention to provide control mechanism for a metal removing machine having a tool movable along a predetermined path, comprising means for stopping such movement, operating means responsive to a voltage of predetermined polarity for effecting operation of said stopping means, first voltage producing means for subjecting said operating means to a voltage of one polarity and of a variable magnitude dependent upon the position of the tool along said path, and second voltage-producing means for subjecting said operating means to a voltage of the opposite polarity, said second voltage-producing means including means for selectively varying the magnitude of the voltage of said second voltage-producing means to which said operating means is subjected so as to determine the point along said path where said tool stops.

Another object is to provide a machine as described in the preceding paragraph wherein the means for effecting operation of said stopping means is a diode, preferably a Zener diode.

Another object is to provide a machine as heretofore described wherein the said first voltage-producing means includes a circuit having a voltage source and a resistance variable in accordance with the movement of the tool along its path.

Another object is to provide a machine as described heretofore in which the tool is reversed at each end of its path of travel by operating means for effecting each reversal respectively controlled by Zener diodes.

Another objection is to provide such a machine in which the selectively variable resistances are conveniently located for ready access to the operator of the machine.

Other objects and features of the invention will become apparent as the description proceeds, especially when taken in conjunction with the accompanying drawings, wherein.

Figure 1:
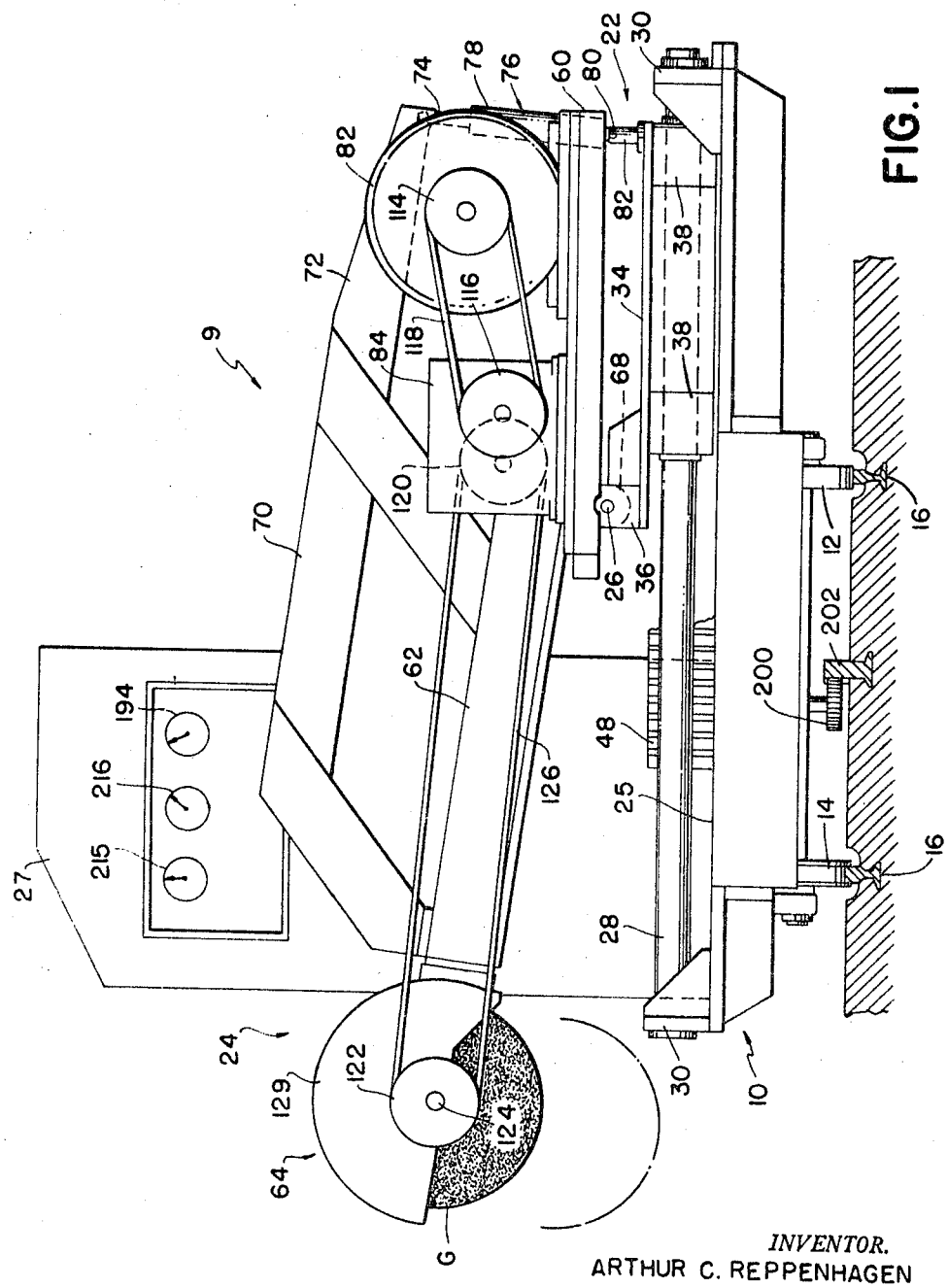
FIGURE 1 is a side elevational view of a grinding machine constructed in accordance with the invention.
Figure 2:
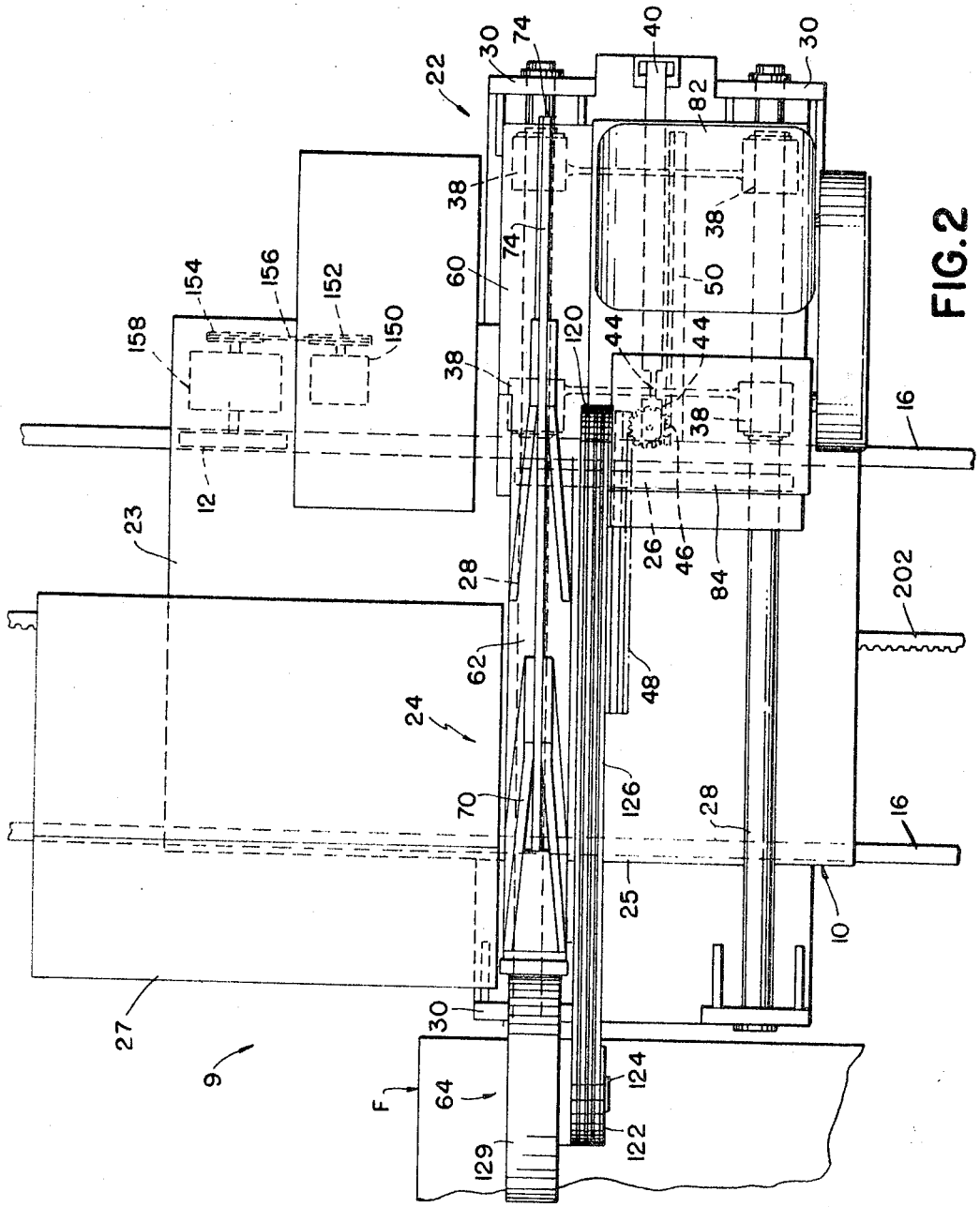
FIGURE 2 is a top plan view of the grinding machine.

Referring now more particularly to the drawings, the grinding machine is generally indicated at 9 and comprises a carriage 10 having wheels 12 and 14 supporting the carriage for movement along a predetermined path on tracks 16 embedded in the floor. The tracks 16 may, for example, extend parallel to the lengthwise dimension of a workpiece F supported in fixed position on a stationary support at one side of the tracks. The workpiece F, which may, for example, be in the form of a metal slab or billet, is supported under the grinding wheel G, so that the grinding wheel may grind a path on the workpiece along its length as the carriage moves on the tracks.

The machine also includes a saddle 22 mounted on the carriage for movement at right angles to the path of the carriage, and a grinding unit 24 is mounted on the saddle for vertical swinging movement about the axis of horizontal pivot 26.

The carriage 10 includes a platform 25 which has an extension 23 for supporting an operator's cab 27 in which the operator is situated and has before him the various controls necessary to operate the machine. The carriage 10 has a pair of cylindrical rods 28 mounted in laterally spaced relation on the platform 25 and extending at right angles to the path of the carriage. The opposite ends of the rods 28 are fixedly secured to rod supports 30 rigidly secured to and projecting upwardly from the top surface of the carriage platform. The rods 28 provide tracks for the saddle 22 and guide it for movement on the carriage at right angles to the path of carriage movement.

The saddle has a deck 34 provided with the upstanding laterally spaced bosses 36. The horizontal pivot shaft 26 extends across the deck 34 parallel to the carriage tracks and is journaled in the bosses 36.

Depending from the deck 34 of the saddle are the four journals 38. These journals are arranged in pairs, two of them being aligned and receiving one of the rods 28, and the other two being aligned and receiving the other rod 28. Accordingly, the journals 38 mount the saddle upon the rods 28 of the carriage in a manner permitting the saddle to slide from one end of the rods to the other in a direction at right angles to the path of the carriage.

A cylinder 40 is mounted on platform 25 of the carriage, extending parallel to rods 28. The cylinder 40 is located between rods 28 and has a piston (not shown) therein to which the follower 42 is connected by piston rod 44. The follower 42 has a freely turning pinion 46 mounted thereon on a vertical axis, one side of the pinion meshing with the rack 48 on the platform 25 of the carriage, and the other side of the pinion meshing with a rack 50 secured to the underside of the deck 34 of the saddle. The racks 48 and 50 extend parallel to the rods 28, that is in the direction of saddle movement. When the piston in cylinder 40 is extended to advance the saddle to the left in FIGURE 1, the movement of the saddle will be twice the stroke of the cylinder 40 by reason of the rack and pinion arrangement. Suitable controls are provided to reverse the cylinder so as to cause the saddle to return to its retracted position at the right on the carriage as viewed in FIGURE 1.

The grinding unit 24 includes a base 60, a boom 62 projecting outwardly from the base in the direction of saddle movement, a grinding head 64 mounted on the outer end of the boom, and a power transmission mounted on the base 60. The base 60 of the saddle has depending bearings 68 journaled on the horizontal shaft 26 to provide the means for mounting the grinding unit upon the saddle for vertical swinging movement about the horizontal axis of shaft 26.

The boom 62 has a rigidifying frame structure 70. This frame structure has a rearwardly extending portion 72 secured to the connecting rod 74 of the hydraulic piston-cylinder assembly 76. The hydraulic assembly 76 includes a cylinder 78 pivoted at 80 to a bracket 82 on the deck 34 of the saddle, a piston (not shown) within the cylinder, and a connecting rod 74 which as stated is secured to the rear end 72 of the frame structure 70 of boom 62. Suitable controls may be provided to reverse the piston within cylinder 78 to raise and lower the grinding head 64 on the outer end of the boom. Actually the entire grinding unit will pivot about shaft 26 in response to the operation of the hydraulic assembly 76, it being understood that the boom 62 is rigid with the base 60 of the grinding unit. The inner end of the boom 62 and the rigidifying structure 70 are rigidly secured to the forward end of base 60.

The power transmission includes a motor unit 82 and a gear reduction unit 84 mounted on the base 60. The motor unit has an output pulley 114 and the gear reduction unit has an input pulley 116. The belt 118 extends around the pulleys to transmit power from the motor to the gear reduction unit. The gear reduction unit has an output pulley 120, and the grinding head 64 has a pulley 122. The pulley 122 is secured by any suitable means to a shaft 124 to which the grinding wheel G is also secured. A belt 126 extends over pulleys 120 and 122 to transmit the drive from gear reduction unit 84 to the grinding wheel G. Grinding wheel G is shrouded in a cover 129.

In the present instance, the carriage 10 is moved back and forth along tracks 16 by the operation of a reversible rotary hydraulic motor 150. The motor is mounted on the carriage platform and has a driving pulley 152 which drives a pulley 154 through a belt 156. The pulley 154 is carried by the transmission 158, and through suitable gearing in the transmission applies driving power to one of the carriage wheels 12 or 14.

The hydraulic fluid for operating the motor 150 is delivered through one of the lines 180 and 182, depending on the direction of the carriage movement desired. The other line then acts as a return line for the hydraulic fluid. Valve 184 determines the direction of motor rotation by opening one of the lines 180, 182 to hydraulic fluid pressure in the input line 186 and opening the other line to the output or exhaust line 188. Valve is controlled by the solenoids CRR and CRL. When the solenoid CRR is energized hydraulic fluid is delivered through line 180 to rotate the motor in one direction, and when solenoid CRL is energized hydraulic fluid is delivered to line 182 for rotation of the motor in the opposite direction.

Figure 3:
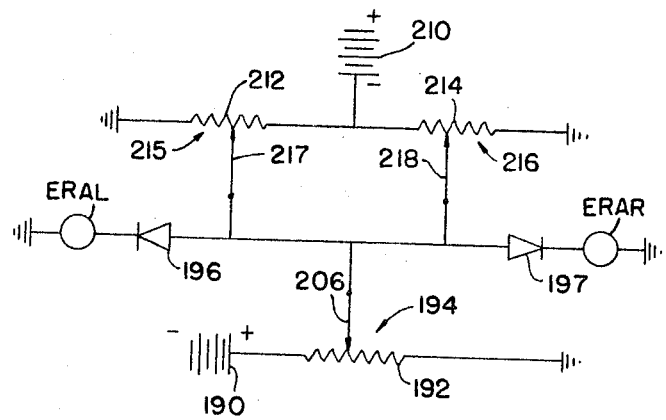
FIGURES 3 and 4 are electrical diagrams.

The carriage has a voltage source 190. With reference to FIGURE 3, the voltage source 190 puts out a constant positive voltage of a predetermined amount, in this instance +18 volts. This voltage passes through resistance 192 of rheostat 194 to the Zener diodes 196 and 197. As the carriage moves along the tracks, a gear 200 rotatably mounted on the carriage engages a rack 202 fixed in the floor between the tracks and through suitable reduction gearing operates arm 206 of rheostat 194 to move the arm over the resistance coil 192. Thus at one extreme position of carriage movement the arm 206 will shunt the resistance coil 192 and tap a full +18 volts, and in another extreme position of the carriage the full resistance of coil 192 will be included in the circuit to reduce the voltage tapped practically to zero. The voltage change is proportional to carriage movement and thus between the two extreme positions of the carriage the voltage tapped varies on a straight line between +18 volts and very near zero volts. At the halfway point in the carriage travel, approximately +9 volts will be tapped and at the three-quarters position approximately +13½ volts will be tapped.

The carriage also carries a second voltage source 210 which puts out a voltage of −18 volts. However, the voltage must pass through the selectively variable resistances 212 and 214 of the set point rheostats 215 and 216. Rheostats 215 and 216, as well as rheostat 194, are located in the operator's cab 27 where they can be readily observed. Rheostats 215 and 216 have arms 217 and 218 which are manually adjusted to determine the amount of resistance in the circuit and hence the magnitude of the voltage tapped. For example, the operator may set these arms so as to tap a −5 volts through resistance 212, and a −14 volts through resistance 214.

The circuit in FIGURE 3 will be seen to include the ERAL relay (electronic relay automatic left) and the ERAR relay (electronic relay automatic right). These relays receive current through the Zener diodes 196 and 197. The Zener diode 196 in this instance is designed to pass current to the relay ERAL when it is subjected to −2 volts, and the Zener diode 197 is designed to pass current to the relay ERAR when subjected to +2 volts. Obviously, the Zener diodes may be selected so as to fire when subjected to a greater or lesser voltage, but 2 volts has been found to be sufficient to operate the relays ERAL and ERAR. In some instances, ordinary diodes which do not require voltage to reach a certain value before firing may be suitable.

Figure 4:
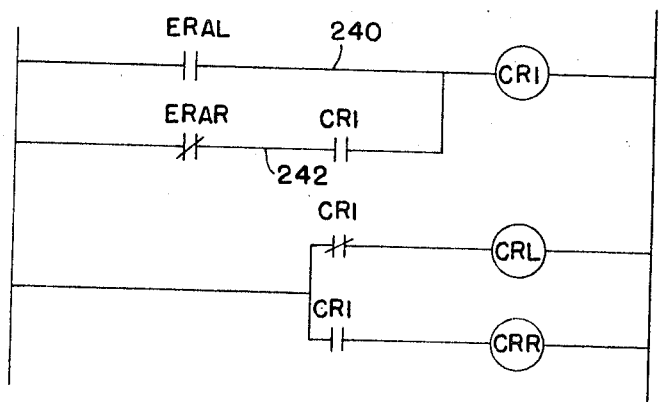
Figure 5:
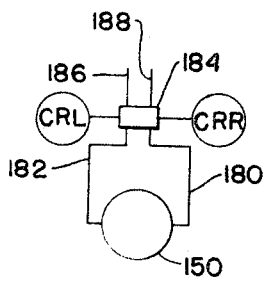
FIGURE 5 is a hydraulic diagram.

FIGURE 4 shows the circuit by which solenoids CRR and CLR are operated. Relay ERAL has a normally open contact in circuit 240 to solenoid CRL. Thus when the ERAL relay is energized during left carriage movement, solenoid CRL will be energized. Energization of solenoid CRL closes its normally open contact in the circuit to solenoid CRR to shift valve 184 for movement of the carriage to the right. Even after the carriage reverses and relay ERAL is deenergized, solenoid CRL remains energized through the holding circuit 242. Hence the carriage will continue in its reversal until the control relay ERAR is energized to open its normally closed contact in the holding circuit 242 and deenergized the relay CRL. De-energization of solenoid CRL opens its contact in the circuit to solenoid CRR and closes its normally closed contact in the circuit to solenoid CRL resulting in shifting of the valve 184 to reverse the carriage.

Let it be assumed that the rheostat 215 is adjusted to tap —5 volts, and the rheostat 216 is adjusted to tap —14 volts. Then assume that when the carriage is moving to the right the voltage from source 190 through resistance 192 of rheostat 194 is increasing. At some point, the voltage tapped by rheostat 194 will exceed the voltage from the negative voltage source 210 tapped by set point rheostat 216. When this plus differential amounts to a certain value, in this instance +2 volts, the Zener diode 197 will fire and allow current to flow to the ERAR relay to reverse the carriage. It is understood, of course, that the voltage to which the diode is subjected is the algebraic sum of the two voltages tapped.

Upon reversal of the carriage the positive voltage tapped from source 190 will decrease and when it decreases below the negative voltage tapped by the set point rheostat 215 in an amount sufficient to fire the Zener diode 196, in this instance —2 volts, the latter will pass current to the ERAL relay to again reverse the carriage.

It will be obvious that by merely changing the setting of the set point rheostats 215 and 216 to tap different voltages, the points where the carriage reverses may be readily altered. The operator can, of course, do this conveniently by manually adjusting the arms 217 and 218 of the rheostats 196 and 197 in his cab.

What I claim as my invention is:

1. A machine for removing metal from a workpiece comprising a tool movable along a predetermined path, means for stopping such movement, operating means responsive to a voltage of predetermined polarity for effecting operation of said stopping means, first voltage-producing means for subjecting said operating means to a voltage of one polarity and of a variable magnitude dependent upon the position of said tool along said path, and second voltage-producing means for subjecting said operating means to a voltage of the opposite polarity, said second voltage-producing means including means for selectively varying the magnitude of the voltage of said second voltage-producing means to which said operating means is subjected so as to determine the point along said path where said tool stops.

2. The machine defined in claim 1, wherein said means for effecting operation of said stopping means is a diode.

3. The machine defined in claim 1, wherein said means for effecting operation of said stopping means is a Zener diode.

4. The machine defined in claim 1 wherein said first voltage-producing means includes a circuit having a voltage source and a resistance variable in accordance with the movement of said tool along its path.

5. A machine for removing metal from a workpiece comprising a grinding wheel movable in opposite directions along a predetermined path, first reversing means for reversing said grinding wheel during movement thereof in one direction, second reversing means for reversing said grinding wheel during movement thereof in the opposite direction, first operating means responsive to a voltage of one polarity and a predetermined magnitude for effecting operation of said first reversing means, second operating means responsive to a voltage of the opposite polarity and a predetermined magnitude for effecting operation of said second reversing means, first voltage-producing means for subjecting said first and second operating means to a voltage of said one polarity and of a variable magnitude dependent upon the position of said grinding wheel along said path, second voltage-producing means for subjecting said first and second operating means to a voltage of said opposite polarity, said second voltage-producing means including means for varying the magnitude of the voltage of said second voltage-producing means to which said first operating means is subjected and means for varying the magnitude of the voltage of said second voltage-producing means to which said second operating means is subjected, thereby to determine the points of reversal of said grinding wheel.

6. The machine defined in claim 5, wherein said first and second operating means comprise Zener diodes.

7. The machine defined in claim 6, wherein said first voltage-producing means includes a circuit having a voltage source and a resistance variable in accordance with the movement of the grinding wheel along its path.

References Cited

UNITED STATES PATENTS 3,149,439 9/1964 Beattie et al. _____ 51—92
3,258,680 6/1966 Ward _____ 307—318 X JAMES L. JONES, Jr., *Primary Examiner.*

U.S. Cl. X.R.

51—56